June 4, 1963  H. WURZEL  3,091,841
TOOLS FOR HANDLING SPLIT RETAINING RINGS

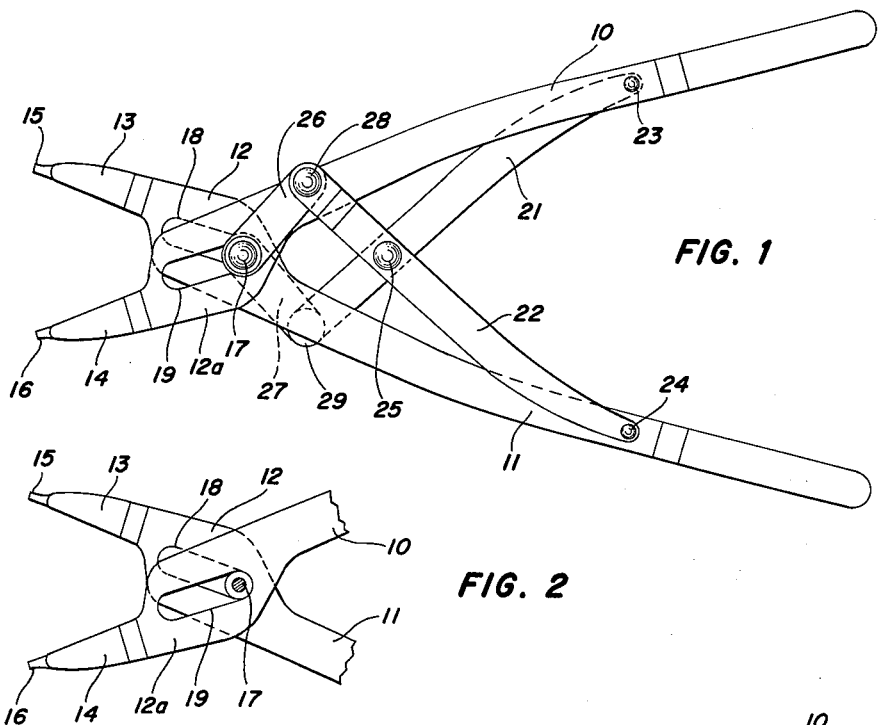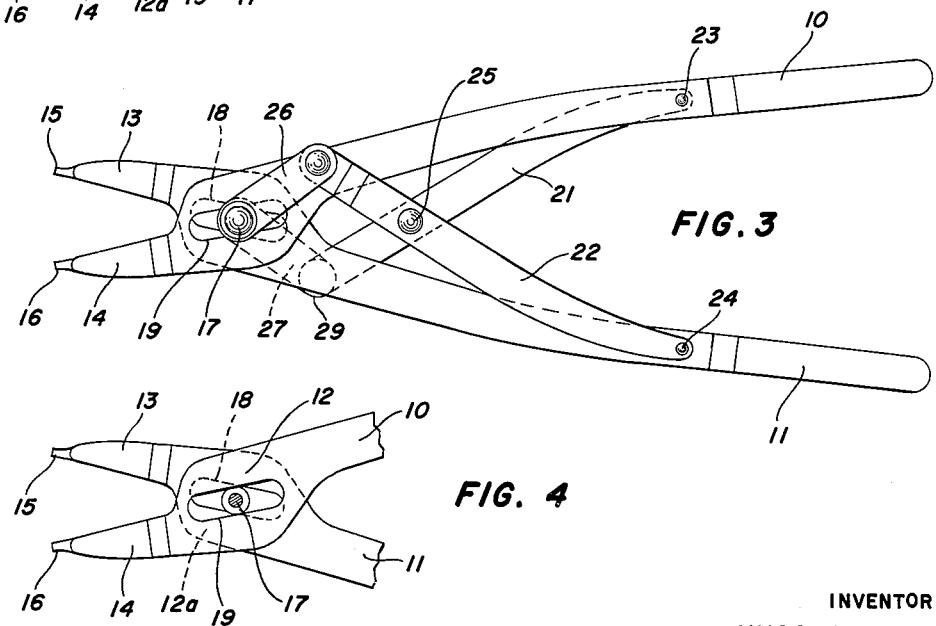

Filed July 6, 1961  3 Sheets-Sheet 2

INVENTOR
HUGO WURZEL
BY *Harold Kilcoyne*
ATTORNEY

United States Patent Office 3,091,841
Patented June 4, 1963

3,091,841
TOOLS FOR HANDLING SPLIT RETAINING RINGS
Hugo Wurzel, New York, N.Y., assignor to Waldes Kohinoor, Inc., Long Island City, N.Y., a corporation of New York
Filed July 6, 1961, Ser. No. 122,213
9 Claims. (Cl. 29—229)

This invention relates to improvements in tools for handling split spring retaining rings, and more particularly to an improved pliers-type tool for use in spreading or contracting such rings, depending on whether they are external or internal rings, and thereupon holding and/or manipulating them as may be necessary in their assembly on shafts or in housing bore grooves.

As is well known, split spring retaining rings are widely used to form artificial shoulders on shafts (external rings) or in the bores of housings (internal rings). To assemble such rings, the external ring must be expanded to an internal diameter slightly exceeding the diameter of its shaft and then moved axially over and along the shaft end to the plane of its seating groove in which, when released, it spring-seats itself. Conversely, the internal ring must be contracted to an external diameter slightly less than that of the bore of its housing and then inserted in and moved axially along the bore to the plane of its seating groove, into which it is released.

The handling of such rings, i.e. the spreading of internal and the contracting of the external rings, is preferably effected by means of pliers having pin-like working points which are inserted into apertures provided for this purpose at the free ends of the ring bodies. Obviously, with the larger size rings, closing of the pliers handles requires the application of considerable force. But even with the smaller size rings, the resistance to closing the handles increases with the stress which builds up in the ring during the handle closing operation. Thus, while at the beginning of handle throw closing is comparatively easy in the conventional pliers, the resistance to closing may increase uncomfortably as the handle-closing movement proceeds. Such creates special difficulties when, for example, it is desired to close the pliers handles with one hand while the other hand is otherwise occupied, say with holding and adjusting the rings being assembled. With larger rings, the force necessary to spread or contract same may even exceed the strength of the average operator or at least it may become so great as to make the assembly of the ring a laborious undertaking.

It is therefore a major object of the present invention to obviate the aforesaid objection to the use of pliers-type tools in handling split spring retaining rings, by providing a pliers which is so constructed and arranged that the ultimate closing force required to operate same is appreciably less than the force necessary to close the handles of standard pliers. Such is accomplished by incorporating into the pliers means operating responsive to handle-closing movement to increase the transmission ratio of the pliers. In explanation, the force required to close the pliers handles depends on the leverage provided by the pliers arms, i.e. on the ratio of the distance from the fulcrum to the handles whereat the closing force is applied, to the distance between the fulcrum and the pliers working points. By increasing this ratio continuously while the handles are being closed, the ultimate force required for this purpose becomes considerably smaller. Such increase in leverage ratio is effected, according to the invention, by positively shifting the pivot which connects the pliers arms from a normal position nearer to the handles to a position nearer to the pliers points responsive to closing of the handles. In this way the increasing stresses which build up in the ring during its contraction or expansion is in large measure compensated for, since the force exerted by the operator increases relatively slowly when the closed position of the handles is approached. While such an arrangement may require a somewhat larger force to be initially applied to the handles as compared to that required for the conventional pliers, due to the fact that the throw of the pliers tips in response to initial closing movement of the handles is greater with pliers of the invention than with conventional pliers, the force required to effect final closing movement of the handles is substantially less than that required for the conventional pliers.

The above and other objects and advantages of the improved pliers-type tool for handling split spring retaining rings according to the present invention will appear from the following detailed description and accompanying drawings, wherein:

FIG. 1 is a plan view of a so-called internal pliers according to the invention shown in the handles-open position thereof;

FIG. 2 is a fragmentary plan view illustrating the hub and working end of the pliers shown in FIG. 1, with the linkage for shifting the pivot omitted for sake of clearness;

FIGS. 3 and 4 are views similar to FIGS. 1 and 2, respectively, but showing the pliers with the handles in an intermediate (approximately half-closed) position;

Figure 5:
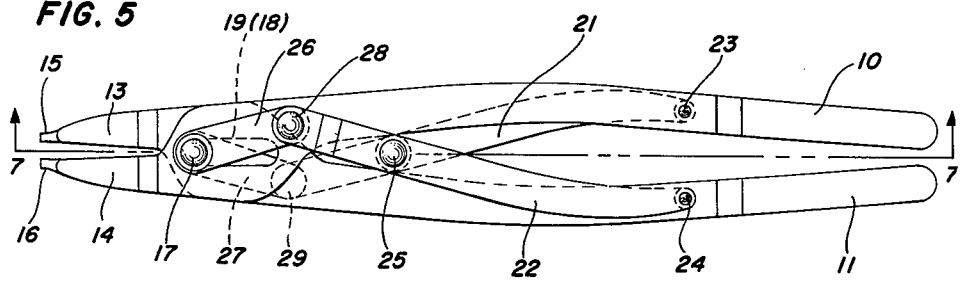
FIGS. 5 and 6 are again views similar to FIGS. 1 and 2, respectively, but illustrating the pliers in the fully closed position of the handles.

The so-called internal pliers shown in FIGS. 1–7 and FIGS. 9–10 is of the crossed handle type, that is to say, the elongated pliers arms which includes the handle ends 10 and 11 (hereinafter for convenience referred to simply as handles), the parallelly disposed hub portions 12 and 12a, and the tip ends 13, 14 which terminate in pin-like working points 15, 16, cross each other in the region of their aforesaid hub portions whereby, with closing of the handles 10, 11, the tip ends and more particularly their working points 15, 16 approach each other. Conversely, when the handles are released, the tips 13, 14 and their working points 15, 16 move away from one another and, to render such separating action positive, a spring (not shown) reactive between the priers handles is usually provided. Thus, when the aforesaid working points 15, 16 are inserted in the holes or apertures provided at the free ends of a ring body, the ring is contracted with closing of the handles 10, 11, such assuming that the handle-closing force is sufficiently great as to exceed the gradually increasing stress which builds up in the ring body. It will be understood, of course, that the overall design of the pliers is such that the throw of the handles in moving from their full-open to their full-closed position (the latter being shown in FIG. 5) will be such as to effect a desired amount of contraction of the particular size of rings being handled and/or assembled by the pliers.

Figure 6:
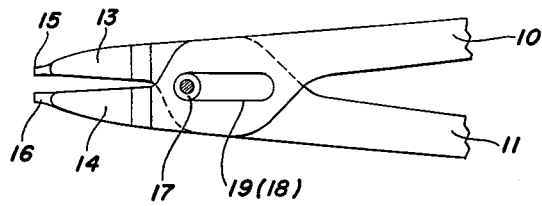
Figure 7:
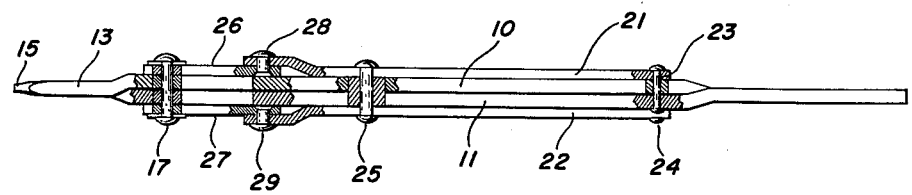
FIG. 7 is a section taken along line 7—7 of FIG. 5.

The aforesaid pliers arms are pivotally interconnected by means of a pivot pin 17 extending transversely through their hub portions 12, 12a. According to the invention, the pivot 17, rather than having a fixed position as is conventional, instead has the capability of moving or shifting forwardly, i.e. toward the working points 15, 16, with closing movement of the handles 10, 11. For this purpose, said hub portions 12, 12a are provided with longitudinal slots 18, 19 which, although slightly inclined to one another, extend generally parallel to the longitudinal axis of said pliers arms. More particularly, the slots 18, 19 have a normal divergent relationship when the handles are in their full open position and a parallel aligned relationship when the handles are in their closed position, and they cross one another, thus at their point of crossing to define a transverse through opening for the pivot pin 17. Moreover, the relation and arrangement of slots is such that the pivot pin may move from a relatively rearwardmost position (nearest the handles 10, 11) in which it is shown in FIGS. 1 and 2 through an intermediate position in which it is shown in FIGS. 3 and 4 to an ultimate or forwardmost position, in which it is shown in FIGS. 5–7 inclusive.

Figure 9:
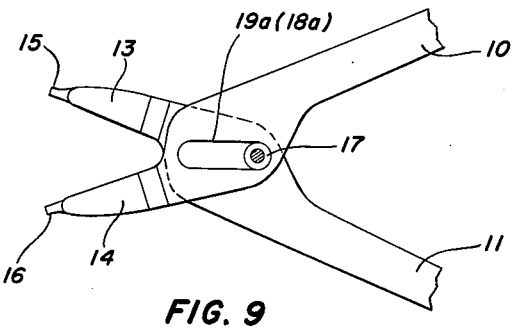
FIGS. 9 and 10 are fragmentary plan views of internal pliers having a modified arrangement of pivot guide slots.
Figure 10:
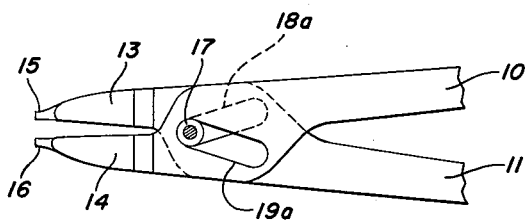

While the just described arrangement is one in which the slots 18 and 19 are in divergent relation when the pliers handles are in their full-open position and in parallel aligned relation when said pliers handles are in their closed position, FIGS. 9 and 10 illustrate a modified disposition in which the slots designated 18a, 19a are in parallel aligned relation when the handles are in their full-open position and in a divergent relation when the handles are in their full-closed position. Of course, in such a modified arrangement, the slots 18a, 19a will diverge towards the handle ends of the pliers arms rather than towards the working-point ends, as with the FIGS. 1–7 modification.

According to the invention, means are also provided for effecting positive automatic shifting movement of the pivot 17 along the slots 18 and 19 (or 18a and 19a), responsive to closing movement of the handles 10, 11, such preferably comprising a longitudinally extensible linkage means or system operative between the handles and pivot which operates similarly to a so-called lazy-tong linkage. More particularly, such linkage comprises a first pair of arms 21, 22 which are pivotally connected at their relatively rearward ends as by pivots 23, 24 to fixed points of the pliers handles 10 and 11, respectively, and cross one another, and are further pivotally connected at their point or region of crossing by a pivot pin 25; and a second pair of arms 26, 27 whose relatively rearward ends are pivotally connected to the forward ends of the aforesaid arms 21, 22 by pivots 28, 29, and in whose forward ends the aforesaid pivot 17 is journaled. Such an arrangement provides that when the handles 10, 11 are moved in closing direction, the relatively rearward ends of the arms 21, 22 of the lazy-tong linkage system move therewith, such resulting in elongation of the linkage and relatively forward projection of the pivot 17 along the slots 18, 19. Consequent to this forward movement of the pivot pin 17, the transmission ratio of the pliers is progressively increased.

Figure 8:
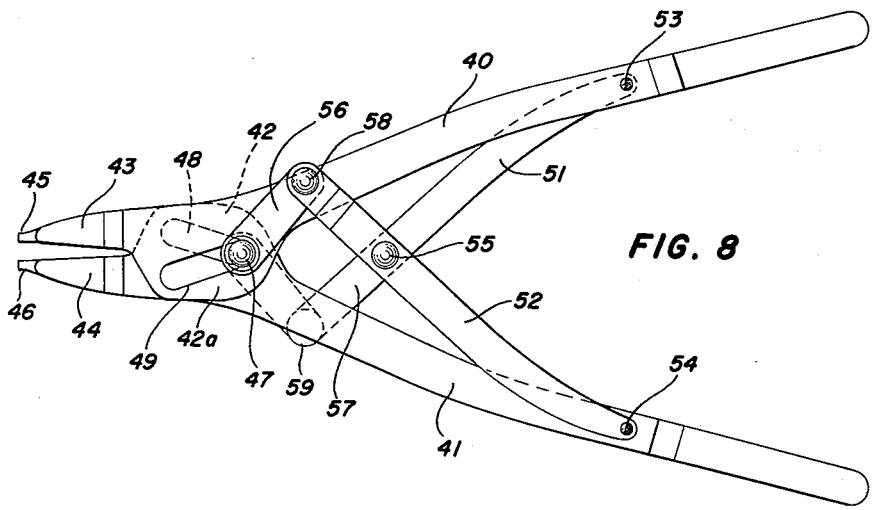
FIG. 8 is a plan view of a pair of so-called external pliers embodying the invention in the normal or open-handle position thereof.

The aforesaid slot arrangement and means for shifting the pivot in the direction of the working points responsive to closing of the pliers handles may also be applied to the so-called external pliers serving to spread external rings over the ends of shafts as is required in the assembly of such rings. Referring to FIG. 8, illustrative of such an application, the external pliers there illustrated comprises a pair of elongated arms providing handle ends 40, 41, parallelly disposed hub portions 42, 42a, tips 43, 44 terminating at their free ends in working points 45, 46, and a pivot 47 connecting said arms for relative angular motion, all as previously described, but said arms extend generally parallel to one another rather than being disposed in crossed relation as in the case of the internal pliers. The hub portions are provided with longitudinal slot-like openings 48, 49 which normally cross one another at their rearward ends and through which the pivot 47 passes, and said pivot is progressively shifted forwardly along the slots with closing movement of the handles by a lazy-tong linkage mechanism 51–59 corresponding in all substantial respects to the linkage 21–29 previously described in connection with the FIGS. 1–7 modification.

Thus, upon closing of handles 40, 41, the pin-like working points 45, 46 which in the external pliers are normally positioned close to one another to correspond to the small spacing between the apertures provided in the ends of external rings in their unstressed state are forced apart responsive to closing of the handles, thus to effect spreading of the ring with which the points are engaged. Also according to the invention, the pivot 47 is projected forwardly along the slots 48, 49 in the direction of said working points as the lazy-tong linkage is elongated, thus to progressively increase the transmission ratio of the pliers as the ring is being spread, all as previously explained.

From the above description it will be seen that the improved pliers of the invention takes into account the following considerations:

(1) The energy required for the deformation of a ring of given dimensions in order either to contract it until it can be inserted into a housing bore or to spread it until it can be shifted over a shaft end has a given value depending on the dimensions of the ring.

(2) The work performed in closing the handles by hand must have the same given value, because this work is transformed into the energy required for the deformation of the ring.

(3) In conventional pliers with a fixed fulcrum, the work to be performed by closing of the handles increases in proportion to the degree of contracting or spreading of the ring.

(4) When the position of the fulcrum is continuously shifted in the direction of the pliers tips during closing of the handles according to the improved pliers of the invention, the throw of the pliers tips is greater for the initial throw of the pliers handles in closing direction than with conventional pliers with fixed pivot (this of course assuming equal throw of the pliers handles under both conditions) so that, during the initial stage of handle closing movement, somewhat greater work is to be transmitted to the pliers tips. From a certain point of handle closing on, however, the throw of the pliers tips is less by the same amount that it was increased during the first portion of handle-closing throw, and therefore the average force required to be exerted on the handles becomes correspondingly smaller. Thus it is that the work of the operator is lessened during the later stage of handle closing when the resistance of the ring to further deformation is greatest.

The end result achieved by the improved pliers of the invention is therefore as follows: In the initial period of deforming a retaining ring, a somewhat larger force must be applied to the pliers handles as compared to that required with conventional handles, while in the final period of ring deformation a much smaller force is required.

Figure 11:
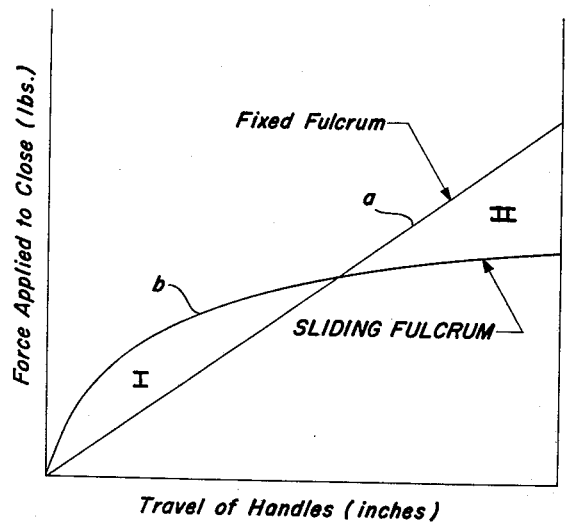
FIG. 11 is a work-energy diagram which graphically illustrates the lesser force required to finally close the handles of the improved pliers of the invention as compared to that required to finally close the handles of a comparable standard pliers employing a fixed fulcrum.

The work-energy diagram (FIG. 11) illustrates this notable advantage of the improved pliers in a graphic manner by comparing its force-of-application curve with that of a conventional pliers employing the fixed fulcrum. In said diagram, the abscissa represents the stroke of the pliers, and the ordinate the force required to operate the pliers handles. The straight line curve a shows how, in the conventional pliers, the force-to-be-applied increases continuously with closing of the handles. On the other hand, the curve b shows that with pliers of the invention the corresponding force increases more rapidly during initial closing movement of the pliers but that from a certain point beyond it increases only moderately and ultimately is substantially less than for the standard pliers.

Thus it will be seen that pliers of the invention effects a different distribution of the work required to be applied with closing of the pliers handles in deforming a retaining ring as necessary for its assembly, which greatly helps the operator at the later and usually the hardest stage or ring deformation. In passing, it is noted that the FIG. 11 diagram also illustrates that the areas designated I and II are of necessity equal, since the deformation energy transmitted to the ring in both instances is constant.

As many changes could be made in carrying out the above constructions without departing from the scope of the invention, it is intended that all matter contained in the above description or shown in the accompanying drawings shall be interpreted as illustrative and not in a limiting sense.

I claim:

1. A pliers-type tool for handling split spring retaining rings comprising, in combination, a pair of elongated lever arms having handle ends, intermediate hub portions and tip ends terminating in working points, a pivot pin extending transversely through said hub portions and pivotally connecting said arms for relative angular motion, said hub portions having elongated slot-like openings through which said pivot pin extends, and longitudinally extensible linkage means interposed between and operatively interconnecting corresponding outer portions of the handle ends and said pivot pin for progressively projecting the pivot pin along said slots in the direction of said working points responsive to closing movement of the handle ends, thereby lengthening the handle ends and shortening the tip ends of the lever arms as effects automatic increase in the transmission ratio of the tool with closing of said handle ends.

2. A pliers-type tool according to claim 1, wherein said extensible linkage means comprises a lazy-tong linkage consisting of first and second pairs of lever arms pivotally connected to one another and to said handle ends and said pivot pin in such manner that said linkage is extended with closing of the handles to in turn project the pivot pin along the slots in relatively forward direction.

3. A pliers-type tool according to claim 1, wherein the lever arms cross one another whereby closing movement of the handles effects movement of the working points towards one another.

4. A pliers-type tool according to claim 1, wherein the lever arms are pivotally connected to one another in such manner that the handle and tip ends of each arm lie on the same side of the pivot pin whereby closing movement of the handles effects movement of the working points away from one another.

5. A pliers-type tool according to claim 1, wherein the slot-like openings in the hub portions have forwardly divergent relationship and cross at their relatively rearward ends when the handle ends are in their normal open position and align with one another throughout their length when the handle ends are in their closed position.

6. A pliers-type tool according to claim 1, wherein the slot-like openings in the hub portions are aligned with one another throughout their length when the handle ends are in their normal open position and have rearwardly divergent relationship when the handle ends are in their closed position.

7. A pliers-type tool for handling split spring retaining means comprising, in combination, a pair of elongated lever arms including parallelly disposed hub portions, handle ends and tip ends which terminate in working points, a pivot pin extending transversely through said hub portions and interconnecting said arms in such manner that the handle and tip ends of each arm lie on the same side of the pivot pin while providing for relative angular movement thereof, the hub portions having openings for the pivot pin which are elongated in the direction of the length of said arms, said pivot having a normal position adjacent the relatively rearward ends of said openings, and linkage means connected to the handle ends and said pivot pin, respectively, and being operative to project the pivot pin forwardly along openings responsive to closing movement of the handle ends.

8. A pliers-type tool according to claim 7, wherein said linkage means comprises a lazy-tong linkage system.

9. A pliers-type tool according to claim 7, wherein said linkage means comprises a first pair of crossed, pivotally connected lever arms, the relatively rearward ends of said arms being pivotally connected to said handle ends at fixed points thereof, and a second pair of lever arms pivotally connected at their rearward ends to the forward ends of the arms of the first pair thereof and converging towards one another and being pivotally interconnected at their forward ends by said first-named pivot pin.

References Cited in the file of this patent

UNITED STATES PATENTS

| | | |
|---|---|---|
| 1,772,224 | Peterson | Aug. 5, 1930 |
| 2,166,089 | Brenner | July 11, 1939 |
| 2,222,744 | Gallien | Nov. 26, 1940 |
| 2,483,380 | Duffy | Sept. 27, 1949 |